July 17, 1923.
E. G. DEUCHER
SUPPORT FOR SPRING VEHICLES
Filed March 11, 1921
1,461,894
2 Sheets-Sheet 2
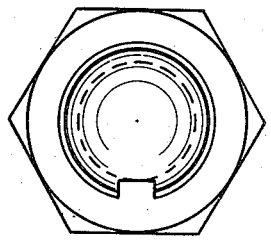
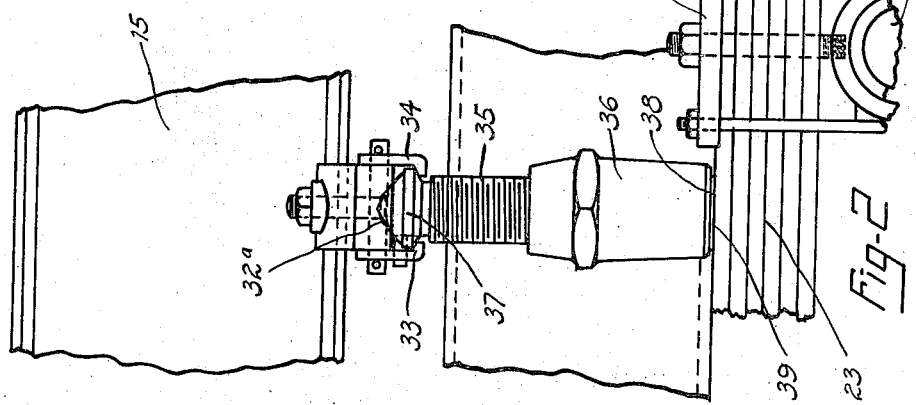
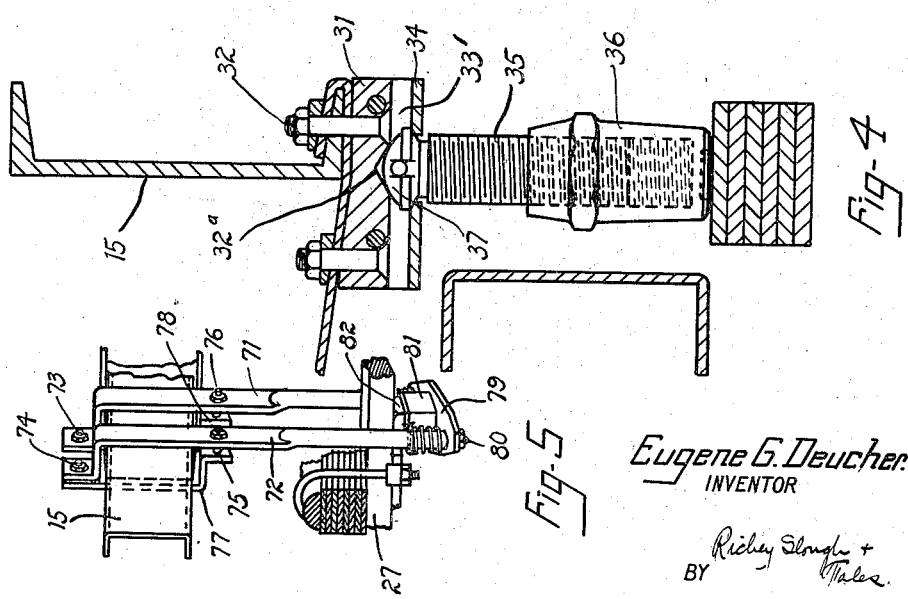
Eugene G. Deucher,
INVENTOR
BY Richey Slough + Tales
HIS ATTORNEYS Patented July 17, 1923.

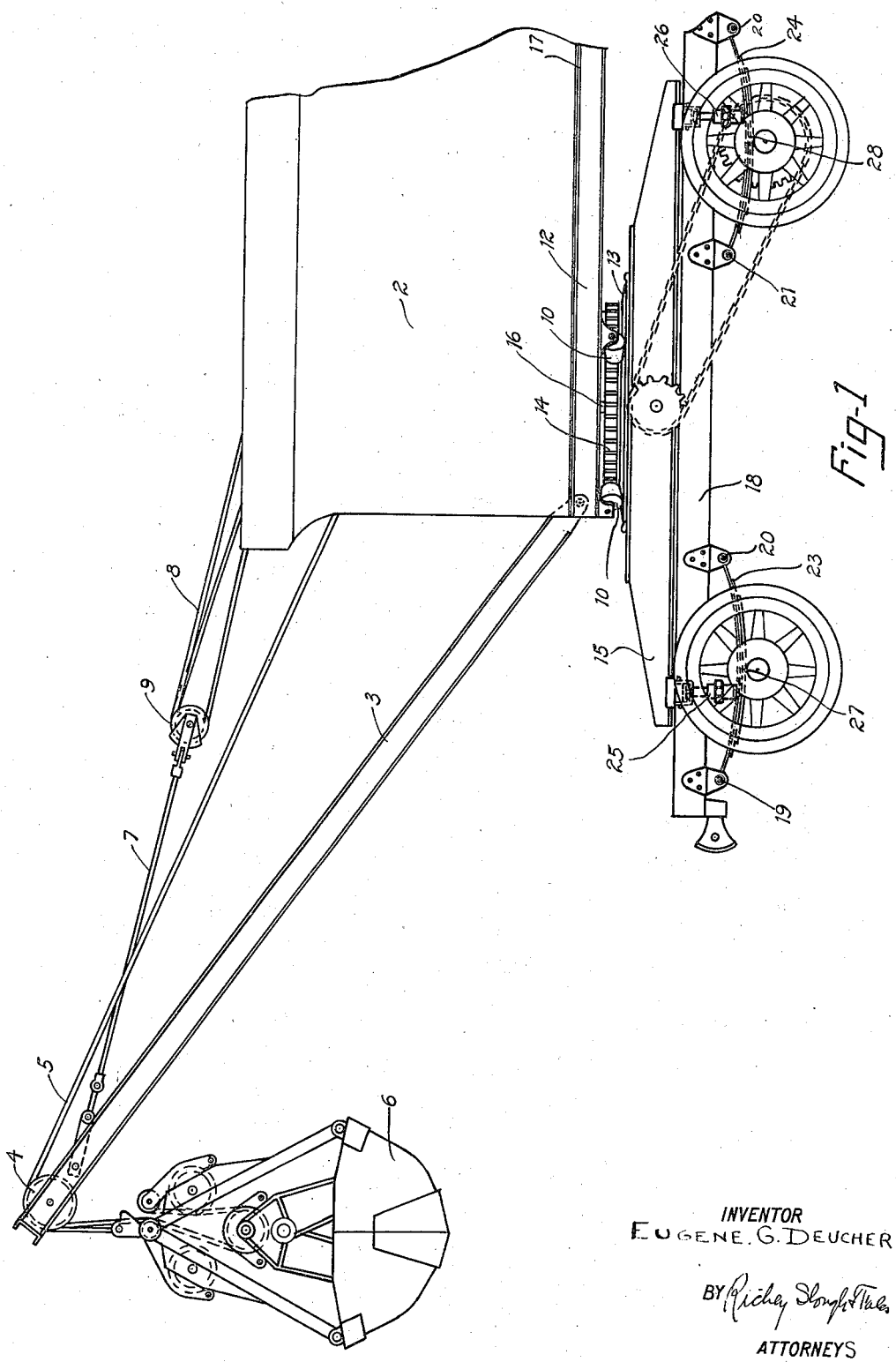

1,461,894

UNITED STATES PATENT OFFICE.

EUGENE G. DEUCHER, OF CLEVELAND, OHIO, ASSIGNOR TO THE UNIVERSAL CRANE COMPANY, OF CLEVELAND, OHIO, A CORPORATION OF OHIO.

SUPPORT FOR SPRING VEHICLES.

Application filed March 11, 1921. Serial No. 451,598.

*To all whom it may concern:*

Be it known that I, EUGENE G. DEUCHER, a citizen of the United States, residing at Cleveland, Cuyahoga County, Ohio, have invented certain new and useful Improvements in Supports for Spring Vehicles, of which the following is a full, clear, concise, and exact description.

My invention relates to supports for spring vehicles and more particularly to auxiliary support for a highly springed vehicle capable of moving over ordinary highways at a relatively high rate of speed, and carrying on its frame a mechanism, such as a power crane mechanism, which is only brought into use when the vehicle is at rest, or under slow motion, and when the highly springed support for the frame is not required.

It has been proposed to mount upon the frame of an automobile truck or auto-motive trailer, a crane mechanism comprising a source of power, such as a gasoline engine or equivalent motor, and to mount together with the source of power, a boom and hoist mechanism co-operating therewith, to elevate and lower a crab mechanism or bucket of any desired character, and the boom, hoisting mechanism motor, together with suitable controlling means, are rotatably mounted on the frame of the truck or trailer. In such an arrangement the above parts are capable of rotating about a longitudinal center, in some cases, as far as around a complete circle, and the weight of the supported crab or bucket, together with the material therein contained, such as dirt, rocks or the like upon which the crane is operating is carried at a distance from the support, and the load is suddenly applied and suddenly released with the boom at various angles; and it is an object of this invention to prevent under such conditions, the springs of the vehicle giving way so as to cause the vehicle to up-set, or to break the springs or to prevent that degree of control over the crane which is to be desired and which it is an object of my invention to secure.

Other objects of my invention and the invention itself, will be more apparent by reference made to the accompanying drawings, in which is illustrated an embodiment of my invention.

Referring to the drawings:

Fig. 1 illustrates an automobile trailer employing auxiliary supports embodying my invention, the said trailer having mounted thereon a rotatable crane mechanism.

Fig. 2 shows an enlarged view of the support of my invention, together with certain portions of the adjacent parts with which the support is adapted to co-operate.

Fig. 3 shows a plan view of the weight supporting member of my invention.

Fig. 4 shows an end view, partly in section, of the support and associated parts illustrated in Figs. 1 and 2.

Fig. 5 shows a view of a restraining yoke mechanism attached to the frame of the vehicle and preventing relative movement of the axle and the said vehicle frame in an upward direction beyond a predetermined upward movement.

Referring now to the drawings, in all of which recurring, identical illustrated parts will be designated by like reference characters, at 2 is shown a crane rotatable cab in which is contained a gasoline engine or other source of power, together with power transmission means, such as gears, shafts, clutches and the line, together with other controlling means, such as hand-levers, foot-pedals and the like, whereby the said power transmission means may be controlled. Projecting from the bed of the cab 2 is a boom 3, having at its end a pair of sheaves, one of which is shown at 4, over which a hoist cable 5 is carried and which hoist cable is adapted to support a crab bucket mechanism shown at 6. At 7 is shown a bar secured to a boom 3 near its outer end, and due to the action of an elevating cable 8 passing over a sheave 9 secured to the said rod 7, the said boom is adapted to be raised and lowered, as may be desired, when the crane is traveling or at rest, and in the course of the work to be done by the crane.

All of the above described apparatus is carried on rollers 10 fastened to the frame 12 of the cab, and which rollers travel on a track 13. A large gear 14 is also provided capable of being connected with the frame 15, and when so connected, is adapted to operate in connection with a pinion mounted on the frame 12 and rotatable by the source of power carried within the cab, so as to rotate the cab on the rollers 10 about a center of rotation 16. Suitable counterbalancing means, capable of balancing the weight of the boom, cab and excavated material, will of course be provided, being supported on the end 17 of the frame 12, this counter-balancing weight comprising largely the gasoline engine or a like source of power, and power transmission mechanism associated therewith. The frame 15 is the stationary bed of the crane mechanism and is secured on the main frame 18 of the vehicle, and to which main frame at 19, 20, 21 and 22, for the one side of the vehicle, are secured ends of multi-leaf, half elliptical vehicle supporting springs of an ordinary type, these being shown at 23 and 24 for the one side of the vehicle, it being understood that the other side of the vehicle is like that side illustrated.

The springs 23 and 24 are sufficiently heavy only to carry the weight of the cab and the crane mechanism when not in operation and I, therefore, provide auxiliary supports, two of which are shown at 25 and 26, which are capable of bridging to a certain degree herein more specifically referred to, the bed 15 of the crane mechanism and the axles 27 and 28 of the vehicle. These supports are to be illustrated in Figs. 3 and 4, and the balance of the description will more specifically refer to these figures, showing these supports, preferably four in number, two of which are illustrated at 25 and 26 in Fig. 1, the other two being likewise disposed, only on the other side of the vehicle.

Referring now to Figs. 2, 3 and 4, and particularly to Fig. 2, at 27 is shown an axle of the vehicle. At 29 is shown a plurality of leaves of a supporting spring 23, and which leaves are rigidly secured to said axle 27 at a mid-point by the clamping means 30. To the frame 15 of the crane mechanism bed is secured a socket piece 31 by bolts 32. This socket piece contains a concavity 32ª and a socket 33′ comprising the said concavity, and the space between the enclosing side arms 33 and 34; a jack screw comprising the screw member 35 and the nut 36 traveling on the said screw, has a suitably shaped enlarged head 37 fitting in the socket so as to make the jack screw capable of swinging in any desired direction when depending from the said socket.

The adjustable nut 36 is capable of being fastened down on the screw 35 whenever it is desired to work the crane mechanism, the vehicle being stationary at the time, so that its lower face 38 comes into engagement with the top leaf of the leaf-spring of the vehicle at a point 39, the point of contact 39 being relatively near an adjacent point on the leaf-spring, which is just above the axle 27 of the vehicle, but not coinciding with such a position, since it is desired by the use of my invention, to utilize some of the property of flexibility possessed by the spring 23, but generally to dispense with most of the flexibility, it being found that by so arranging the apparatus as illustrated, the sudden shocks imparted to the leaf-spring at the point 39, are capable of being absorbed to a considerable extent, so that the axle 27 of the vehicle is not damaged as would otherwise be the case were the point of impact 39 made to coincide with a point on the vehicle spring and in line with the vehicle axle.

The traveling nut 36, when the vehicle is required to travel, is run up on the screw 35 so that contact with the spring 23 is no longer made and the complete flexibility of the vehicle springs is restored for vehicle traveling purposes.

One of the yoke mechanisms illustrated in Fig. 5 is provided on each side of the vehicle adjacent each spring, such as the springs 23 and 24, and the other springs on the opposite sides of the vehicle, each yoke member comprising a pair of upwardly extending arms 71 and 72, said arms being bolted by bolts 73, 74, 75 and 76 and clamp members 77 and 78 to the frame 15 of the vehicle. At their other ends the yoke arm 71 and 72 pass through a yoke plate 79, there being perforations on either end of the yoke plate to admit the ends of the arms 71 and 72, the ends of said arms being threaded and nuts, such as 80, being secured to the said arms by these threads. The plate 79 has an upwardly extending hollow rectangular-shaped portion 81 into which is placed a rubber bumper element 82. The bumper element 82 is adapted when in use to contact with the axle, such as the axle 27, so as to soften the blow upon the said axle when a weight is suddenly applied on the opposite side of the vehicle, as, for instance, by loading the crab bucket 6, or by suddenly dropping such a loaded bucket. In such an event the jack-screw 26 on the side of the vehicle nearest the applied weight, will be subjected to compressive pressure, and at the same time, the yoke arms 71 and 72 on the opposite side will be subjected to tensile stress. The restraining effect of the yoke arms is for the purpose of preventing the tilting of the vehicle downwardly in the direction of the applied weight, and to maintain the center of mass within a more limited prescribed area bounded by the points where the wheels of the vehicle contact with the ground.

It will thus be observed that the yoke members cooperate with the jack-screw in preventing undue yielding of the vehicle, due to the resiliency of its springs, as 23 and 24, when heavy weights are handled over the end of the boom at a distance from the vehicle.

Having thus described a specific embodiment of my invention, I wish it to be under- stood that numerous and extensive departures may be made from the embodiment of my invention herein illustrated, but without departing from the spirit of the invention, the scope thereof being only limited by the claims of this application.

What I claim is:

1. In combination with a highly springed vehicle, an axle therefor, a vehicle frame, a spring carried by the said axle for resiliently supporting the said frame on the said axle, a relatively non-yielding adjustable bridge adapted to intervene between the said frame and a point on the said spring relatively near the said axle but not coinciding with the position of the said axle.

2. In combination with a highly springed vehicle, an axle therefor, a vehicle frame, a spring carried by the said axle for resiliently supporting the said frame on the said axle, a relatively non-yielding adjustable bridge adapted to intervene between the said frame and a point on the said spring relatively near the said axle but not coinciding with the position of the said axle, said bridge being of adjustable length.

3. In combination with a highly springed vehicle, an axle therefor, a vehicle frame, a spring carried by the said axle for resiliently supporting the said frame on the said axle, a relatively non-yielding adjustable bridge adapted to intervene between the said frame and a point on the said spring relatively near the said axle but not coinciding with the position of the said axle, said bridge normally depending from the said frame.

4. In combination with a highly springed vehicle, an axle therefor, a vehicle frame, a spring carried by the said axle for resiliently supporting the said frame on the said axle, a relatively non-yielding adjustable bridge adapted to intervene between the said frame and a point on the said spring relatively near the said axle but not coinciding with the position of the said axle, said bridge normally depending from the said frame, a universal joint, said joint joining the said frame and bridge.

5. In combination with a highly springed vehicle, an axle therefor, a vehicle frame, a spring carried by the said axle for resiliently supporting the said frame on the said axle, a relatively non-yielding adjustable bridge adapted to intervene between the said frame and a point on the said spring relatively near the said axle but not coinciding with the position of the said axle, said bridge comprising a jack screw and a universal joint to connect the said screw and frame.

6. In combination with a motor truck, a frame therefor, an axle therefor, a laminated supporting spring secured at substantially its mid point to the said axle, said spring being secured at both ends to the said frame, and a relatively non-yielding adjustable bridge adapted to be placed between the said frame and a point on the spring near to but not coinciding with that point thereof where the said spring is secured to the said axle.

7. In combination with a motor truck, a frame therefor, an axle therefor, a laminated supporting spring secured at substantially its mid point to the said axle, said spring being secured at both ends to the said frame, and a relatively non-yielding adjustable bridge adapted to be placed between the said frame and a point on the spring near to but not coinciding with that point thereof where the said spring is secured to the said axle, said bridge comprising a vertically disposed support normally pivoted to the said frame.

8. In combination with a motor truck, a frame therefor, an axle therefor, a laminated supporting spring secured at substantially its mid point to the said axle, said spring being secured at both ends to the said frame, a relatively non-yielding adjustable bridge adapted to be placed between the said frame and a point on the spring near to but not coinciding with that point thereof where the said spring is secured to the said axle, said bridge comprising a vertically disposed support normally pivoted to the said frame, and means to vary the length of the said support.

9. In combination with a highly springed vehicle, an axle therefor, a vehicle frame, a spring carried by the said axle for resiliently supporting the said frame on the said axle, a relatively non-yielding adjustable bridge adapted to intervene between the said frame and a point on the said spring relatively near the said axle but not coinciding with the position of the said axle, and a loop member for restraining relative movement of the said frame in a direction away from the said axle, said loop member being adapted to contact with the said axle at a point distant from the said bridge.

10. In combination with a motor truck, a boom, a rotatable carriage for the said boom and a load supporting mechanism on the end of said boom, an axle and a frame for the said motor truck, springs uniting said axle and said frame near each end of the said axle, relatively non-yielding bridges adapted to be placed between the said frame and the said axle at the said springs, other relatively non-yielding bridges adapted to be placed adjacent the first of said bridges, one of said first bridges adapted to be placed under compressive stress and one of the other said bridges disposed on the other end of the axle from the said first bridge being adapted to be placed under tensile stress when the said load supporting means is supporting a load from an end of the said boom.

11. In combination with a motor truck, a frame therefor, an axle therefor, a plurality of supporting springs adapted to support the said frame on the said axle near each end thereof, a pair of relatively rigid bridges connected to the said frame near each spring, one of said bridges adapted to prevent undue compressive stress being exerted on the said spring, said bridge being adapted to relieve the adjacent spring of the weight of the frame and apparatus carried thereon, the other adjacent bridge being adapted to restrain movement of the said frame away from the said axle.

In witness whereof, I have hereunto signed my name this 7th day of March, 1921.

EUGENE G. DEUCHER.